(12) United States Patent
Traister et al.

(10) Patent No.: US 7,818,493 B2
(45) Date of Patent: Oct. 19, 2010

(54) ADAPTIVE BLOCK LIST MANAGEMENT

(75) Inventors: Shai Traister, San Jose, CA (US); Bum Suck So, San Jose, CA (US); KyeYoon Park, Milpitas, CA (US)

(73) Assignee: SanDisk Corporation, Milpitas, CA (US)

(*) Notice: Subject to any disclaimer, the term of this patent is extended or adjusted under 35 U.S.C. 154(b) by 394 days.

(21) Appl. No.: 11/851,899

(22) Filed: Sep. 7, 2007

(65) Prior Publication Data
US 2009/0070518 A1 Mar. 12, 2009

(51) Int. Cl.
*G06F 13/32* (2006.01)
(52) U.S. Cl. ...................................... 711/103
(58) Field of Classification Search ............... None
See application file for complete search history.

(56) References Cited

U.S. PATENT DOCUMENTS

| | | | |
|---|---|---|---|
| 5,095,344 A | 3/1992 | Harari | 257/328 |
| 5,172,338 A | 12/1992 | Mehrotra et al. | 365/185.03 |
| 5,430,859 A | 7/1995 | Norman et al. | 711/103 |
| 5,602,987 A | 2/1997 | Harari et al. | 714/8 |
| 5,657,332 A | 8/1997 | Auclair et al. | 714/763 |
| 5,663,901 A | 9/1997 | Wallace et al. | 365/52 |
| 5,712,180 A | 1/1998 | Guterman et al. | 438/263 |
| 5,890,192 A | 3/1999 | Lee et al. | 711/103 |
| 6,151,248 A | 11/2000 | Harari et al. | 365/185.14 |
| 6,426,893 B1 | 7/2002 | Conley et al. | 365/185.11 |
| 6,512,263 B1 | 1/2003 | Yuan et al. | 257/316 |
| 6,522,580 B2 | 2/2003 | Chen et al. | 365/185.02 |
| 6,771,536 B2 | 8/2004 | Li et al. | 365/185.02 |
| 6,983,428 B2 | 1/2006 | Cernea | 716/1 |
| 7,023,736 B2 | 4/2006 | Cernea et al. | 365/185.21 |
| 7,139,864 B2 | 11/2006 | Bennett et al. | 711/103 |
| 7,433,993 B2 | 10/2008 | Sinclair | |
| 7,490,283 B2 | 2/2009 | Gorobets et al. | |
| 7,509,471 B2 | 3/2009 | Gorobets | |
| 2003/0065899 A1 | 4/2003 | Gorobets | 711/165 |
| 2005/0141312 A1 | 6/2005 | Sinclair et al. | 711/103 |
| 2005/0141313 A1 | 6/2005 | Gorobets et al. | 711/220 |
| 2005/0144357 A1 | 6/2005 | Sinclair | 711/103 |
| 2005/0144365 A1 | 6/2005 | Gorobets et al. | 711/103 |
| 2005/0144516 A1 | 6/2005 | Gonzalez et al. | 714/8 |
| 2005/0166087 A1 | 7/2005 | Gorobets | 711/173 |
| 2005/0172074 A1* | 8/2005 | Sinclair | 711/114 |
| 2005/0257120 A1 | 11/2005 | Gorobets et al. | 714/763 |
| 2006/0136655 A1* | 6/2006 | Gorobets et al. | 711/103 |

(Continued)

OTHER PUBLICATIONS

Nimrod Megiddo et al., "Outperforming LRU with an Adaptive Replacement Cache Algorithm," IEEE, Apr. 2004, pp. 4-11.

(Continued)

*Primary Examiner*—Tuan V Thai
*Assistant Examiner*—Duc T Doan
(74) *Attorney, Agent, or Firm*—Weaver Austin Villeneuve & Sampson LLP

(57) ABSTRACT

In a nonvolatile memory array, selected blocks are maintained as open blocks that are available to store additional data without being erased first. Nonsequential open blocks are selected from two lists, one list based on recency of the last write operation, and the other list based on frequency of writes to the block. Sequential open blocks are divided into blocks expected to remain sequential and blocks that are not expected to remain sequential.

39 Claims, 10 Drawing Sheets

CHAOTIC UPDATE
(NONSEQUENTIAL)
Example

U.S. PATENT DOCUMENTS

2007/0101095 A1    5/2007  Gorobets .................... 711/203
2008/0071970 A1    3/2008  Lin

OTHER PUBLICATIONS

Nimrod Megiddo et al., "ARC: A Self-Tuning, Low Overhead Replacement Cache," Mar. 31, 2003, 16 pages.

Nimrod Megiddo et al., "Adaptive Replacement Cache," IBM Almaden Research Center, Apr. 3, 2003, 62 pages.

U.S. Appl. No. 11/532,467, filed Sep. 15, 2006, Lin.

Nimrod Megiddo et al., "One Up on LRU," ;login: The Magazine of Usenix and Sage, Aug. 2003, vol. 28, No. 4, pp. 7-11.

* cited by examiner

SEQUENTIAL UPDATE
Example

**CHAOTIC UPDATE
(NONSEQUENTIAL)
Example**

ADAPTIVE BLOCK LIST MANAGEMENT

BACKGROUND OF THE INVENTION

This invention pertains generally to the field of semiconductor non-volatile data storage system architectures and their methods of operation.

A common application of flash EEPROM devices is as a mass data storage subsystem for electronic devices. Such subsystems are commonly implemented as either removable memory cards that can be inserted into multiple host systems or as non-removable embedded storage within the host system. In both implementations, the subsystem includes one or more flash devices and often a subsystem controller.

Flash EEPROM devices are composed of one or more arrays of transistor cells, each cell capable of non-volatile storage of one or more bits of data. Thus flash memory does not require power to retain the data programmed therein. Once programmed however, a cell must be erased before it can be reprogrammed with a new data value. These arrays of cells are partitioned into groups to provide for efficient implementation of read, program and erase functions. A typical flash memory architecture for mass storage arranges large groups of cells into erasable blocks, wherein a block contains the smallest number of cells (unit of erase) that are erasable at one time.

In one commercial form, each block contains enough cells to store one or more sectors of user data plus some overhead data related to the user data and/or to the block in which it is stored. The amount of user data included in a sector is the standard 512 bytes in one class of such memory systems but can be of some other size. Because the isolation of individual blocks of cells from one another that is required to make them individually erasable takes space on the integrated circuit chip, another class of flash memories makes the blocks significantly larger so there is less space required for such isolation. But since it is also desired to handle user data in much smaller sectors, each large block is often further partitioned into individually addressable pages that are the basic unit for reading and programming user data. Each page may store one sector of user data, or a page may store a partial sector or multiple sectors. A "sector" is used herein to refer to an amount of user data that is transferred to and from the host as a unit.

The subsystem controller in a large block system performs a number of functions including the translation between logical addresses received by the memory sub-system from a host, and physical addresses within the memory cell array. This translation often involves use of intermediate terms for a logical block number (LBN) and logical page. The controller also manages the low-level flash circuit operation through a series of commands that it issues to the flash memory devices via an interface bus. Another function the controller performs is to maintain the integrity of data stored to the subsystem through various means, such as by using an error correction code (ECC).

Data from the host is typically just provided to the memory system identified as logical sectors. For example, the host will send data described in terms of a starting logical sector address and the total number of sectors. The controller organizes the host structures into logical constructs that mimic the physical structure for more efficient storage of them in the physical memory. For example, in a common arrangement the memory system controller groups logical sectors (as defined by the host) into logical blocks that correspond in size to the physical structure of a block, which is the physical unit of erase for a flash type memory. The controller can then maintain the relation of the physical structures to the logical constructs, for instance in the form of a Group Address Table (GAT), and updated this correspondence as the logical to physical relation changes.

For greater efficiency, memory systems often increase parallelism by introducing larger structures. For instance, in memory system having a number of semi-autonomous arrays that can be written, read, or both, concurrently, blocks from different arrays are grouped into "meta-block" structures and the controller will form logical blocks of data into corresponding logical meta-blocks, allowing for the multiple blocks to be operated upon at the same time.

In some systems, a limited number of blocks are maintained in an open condition, with blocks being closed as necessary to keep the number of open blocks below the limit. Generally, one block is closed when another is opened. Choosing which blocks to close when opening new blocks may affect performance.

SUMMARY OF THE INVENTION

In an embodiment of the present invention, a method of selecting blocks to close in a block-erasable nonvolatile memory that maintains a limited number of blocks in an open condition to accept additional programming, and maintains other blocks in a closed condition, comprises: maintaining a first list of update blocks containing nonsequentially stored data, each block in the first list individually selected because of one recent nonsequential write operation; maintaining a second list of update blocks containing nonsequentially stored data, each block in the second list individually selected because of two or more nonsequential write operations; maintaining a plurality of open nonsequential update blocks that are available for programming of additional data, the plurality of open nonsequential update blocks each individually listed in the first or second lists, the plurality of open nonsequential update blocks limited to a predetermined maximum number; and selecting a first block from the plurality of open update blocks for a block close operation that removes the first block from the plurality of open nonsequential update blocks and precludes further programming without a block erase, the first block selected to maintain a target composition of blocks from the first list and blocks from the second list in the plurality of open nonsequential update blocks.

In another embodiment, a method of selecting blocks to close in a block-erasable nonvolatile memory that maintains a limited number of blocks in an open condition to accept additional programming and maintains other blocks in a closed condition, comprises: maintaining a first list of update blocks containing sequentially stored data, each block in the first list being identified as likely to remain sequential based on a first pattern of writing data; maintaining a second list of update blocks containing sequentially stored data, each block in the second list being identified as unlikely to remain sequential based on a second pattern of writing data; and maintaining a plurality of open sequential update blocks that are available for programming of additional data, the plurality of open sequential blocks each individually listed in the first list or the second list.

In another embodiment, a method of managing a block-erasable nonvolatile memory array that includes a number of individually erasable blocks comprises: maintaining a first plurality of blocks as closed blocks, which individually contain data and are not available for programming of further data without erase; maintaining a second plurality of blocks as open sequential update blocks that individually contain data stored in a physical order that reflects a logical order of the data, each open sequential update block being available for programming of further data; and maintaining a third plurality of blocks as open chaotic update blocks that individually contain data that is stored in a physical arrangement that does not reflect a logical order, the third plurality of blocks including up to a predetermined maximum number of blocks, the third plurality of blocks selected to include at least one frequently written block, the frequently written block selected on the basis of at least two nonsequential writes to the frequently written block that show a relatively high frequency of writing the frequently written block compared with other blocks of the nonvolatile memory.

In another embodiment, a block erasable nonvolatile memory system, comprises: a first list of update blocks containing nonsequentially stored data, each block in the first list individually selected because of one recent nonsequential write operation; a second list of update blocks containing nonsequentially stored data, each block in the second list individually selected because of two or more nonsequential write operations; a plurality of open nonsequential update blocks that are available for programming of additional data, the plurality of open nonsequential update blocks each individually listed in the first or second lists, the plurality of open nonsequential update blocks limited to a predetermined maximum number; and a target composition of blocks from the first list and blocks from the second list, the target composition used to select a first block from the plurality of open update blocks for a block close operation that removes the first block from the plurality of open nonsequential update blocks and precludes further programming without a block erase.

In another embodiment, a block erasable nonvolatile memory system having a limited number of blocks in an open condition that accept additional programming and having other blocks in a closed condition, comprises: a first list of update blocks containing sequentially stored data, each block in the first list identified as likely to remain sequential based on a first pattern of writing data; a second list of update blocks containing sequentially stored data, each block in the second list identified as unlikely to remain sequential based on a second pattern of writing data; and a plurality of open sequential update blocks that are available for programming of additional data, the plurality of open sequential blocks each individually listed in the first list or the second list.

In another embodiment, a nonvolatile memory system that includes a number of individually erasable blocks comprises: a first plurality of closed blocks, which individually contain data and are not available for programming of further data without erase; a second plurality of open sequential update blocks that individually contain data stored in a physical order that reflects a logical order of the data, each open sequential update block being available for programming of further data; and a third plurality of open chaotic update blocks that individually contain data that is stored in a physical arrangement that does not reflect a logical order, the third plurality of blocks including up to a predetermined maximum number of blocks, the third plurality of blocks selected to include at least one frequently written block, the frequently written block selected on the basis of at least two nonsequential writes to the frequently written block that show a relatively high frequency of writing the frequently written block compared with other blocks of the nonvolatile memory.

DETAILED DESCRIPTION OF ILLUSTRATED EMBODIMENTS

For mass data storage, performance can be improved through increased parallelism, including the formation of larger logical structures, such as meta-blocks, from the underlying physical structures of the memory. Such structures are described in more detail in U.S. patent application Ser. Nos. 10/750,155, filed Dec. 30, 2003; 10/917,888, 10/917,867, 10/917,889, and 10/917,725, all filed Aug. 13, 2004; 10/750,157, filed Dec. 30, 2003; and 10/846,289, filed May 13, 2004, which are hereby incorporated by reference. However, when a host accesses a small logical area, such as a sector or a collection of a small number of sectors, of the card repeatedly and the size, number and location of those small logical areas are not predictable, the controller is faced with a large amount of data relocation, or "garbage collection", and long access time latencies. Various techniques for handling the smaller data portions can be found, for example, in U.S. patent application Ser. No. 10/749,189, filed Dec. 30, 2003, and U.S. application publication No. 2007/0101095.

The following discussion begins with the presentation of an exemplary memory arrangement to provide context for the subsequent discussion of various aspects of the present invention. The following presentation is based on that of U.S. patent application Ser. No. 10/750,155 and is developed in more detail there. This discussion could alternately be based on any number of exemplary memory systems, such as the cyclic storage arrangement of U.S. application publication No. 2003/0065899, which is hereby incorporated by reference.

Exemplary Non-Volatile Memory Structures

Figure 1:
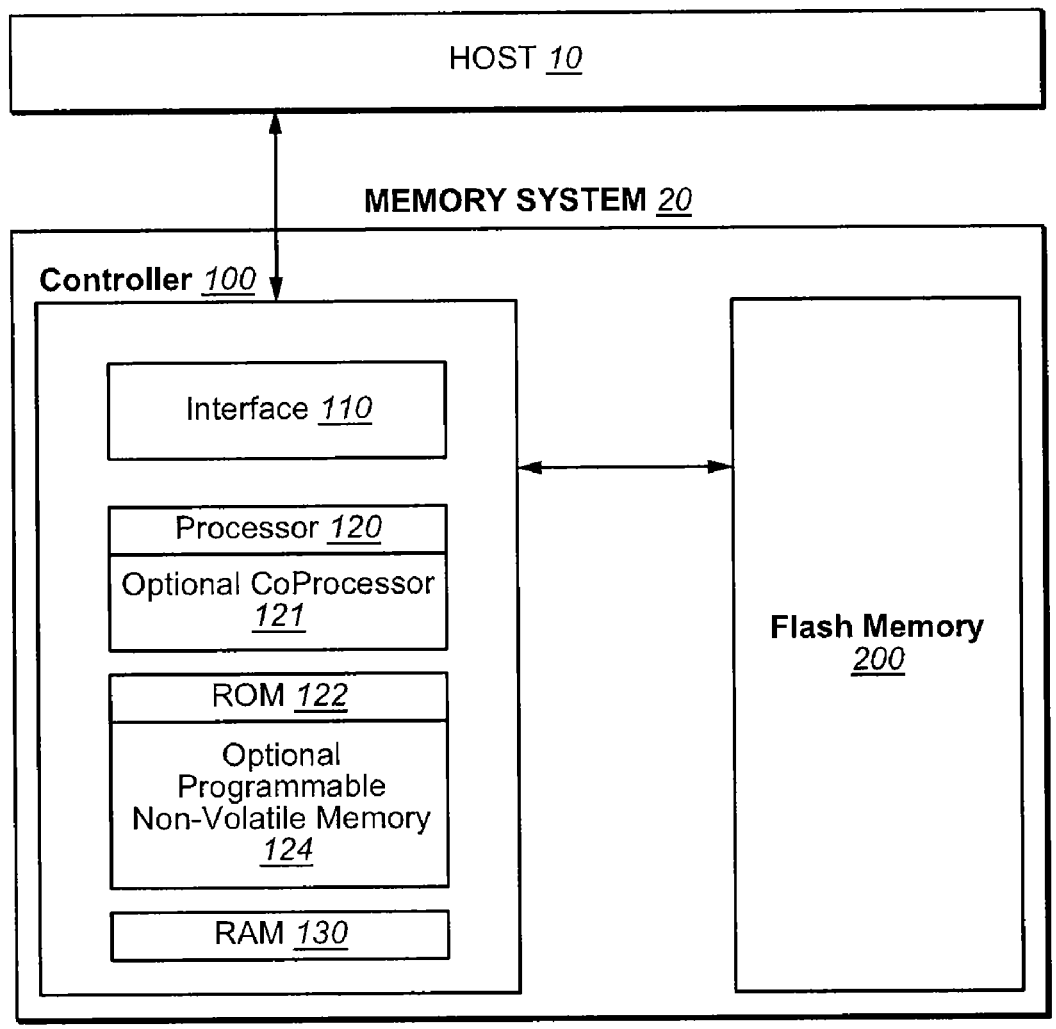
FIG. 1 illustrates schematically the main hardware components of a memory system suitable for implementing aspects of the present invention.

FIG. 1 illustrates schematically the main hardware components of a memory system suitable for implementing aspects of the present invention. The memory system 20 typically operates with a host 10 through a host interface. The memory system is typically in the form of a memory card, USB flash drive, or an embedded memory system. The memory system 20 includes a memory 200 whose operations are controlled by a controller 100. The memory 200 comprises of one or more array of non-volatile memory cells distributed over one or more integrated circuit chip. The controller 100 includes an interface 110, a processor 120, an optional coprocessor 121, ROM 122 (read-only-memory), RAM 130 (random access memory) and optionally programmable nonvolatile memory 124. The interface 110 has one component interfacing the controller to a host and another component interfacing to the memory 200. Firmware stored in nonvolatile ROM 122 and/or the optional nonvolatile memory 124 and/or flash memory 200 provides codes for the processor 120 to implement the functions of the controller 100. Error correction codes may be processed by the processor 120 or the optional coprocessor 121. In an alternative embodiment, the controller 100 is implemented by a state machine (not shown). In yet another embodiment, the controller 100 is implemented within the host.

A number of architectures are used for non-volatile memory arrays such as Flash Memory 200. A NOR array of one design has its memory cells connected between adjacent bit (column) lines and control gates connected to word (row) lines. The individual cells contain either one floating gate transistor, with or without a select transistor formed in series with it, or two floating gate transistors separated by a single select transistor. Examples of such arrays and their use in storage systems are given in the following U.S. patents and pending applications of SanDisk Corporation that are incorporated herein in their entirety by this reference: U.S. Pat. Nos. 5,095,344, 5,172,338, 5,602,987, 5,663,901, 5,430,859, 5,657,332, 5,712,180, 5,890,192, 6,151,248, 6,426,893, and 6,512,263.

A NAND array of one design has a number of memory cells, such as 8, 16, 32, 64 or more cells connected in series string between a bit line and a reference potential through select transistors at either end. Word lines are connected with control gates of cells in different series strings. Relevant examples of such arrays and their operation are given in the following U.S. Pat. No. 6,522,580, and references contained therein. See also U.S. Pat. No. 6,771,536 and application Ser. Nos. 10/254,483, filed Sep. 24, 2002, and 10/665,828, filed Sep. 7, 2003. Other memory systems may use a combination of NOR and NAND or another memory architecture, such as a One Time Programmable (OTP) memory.

Figure 2:
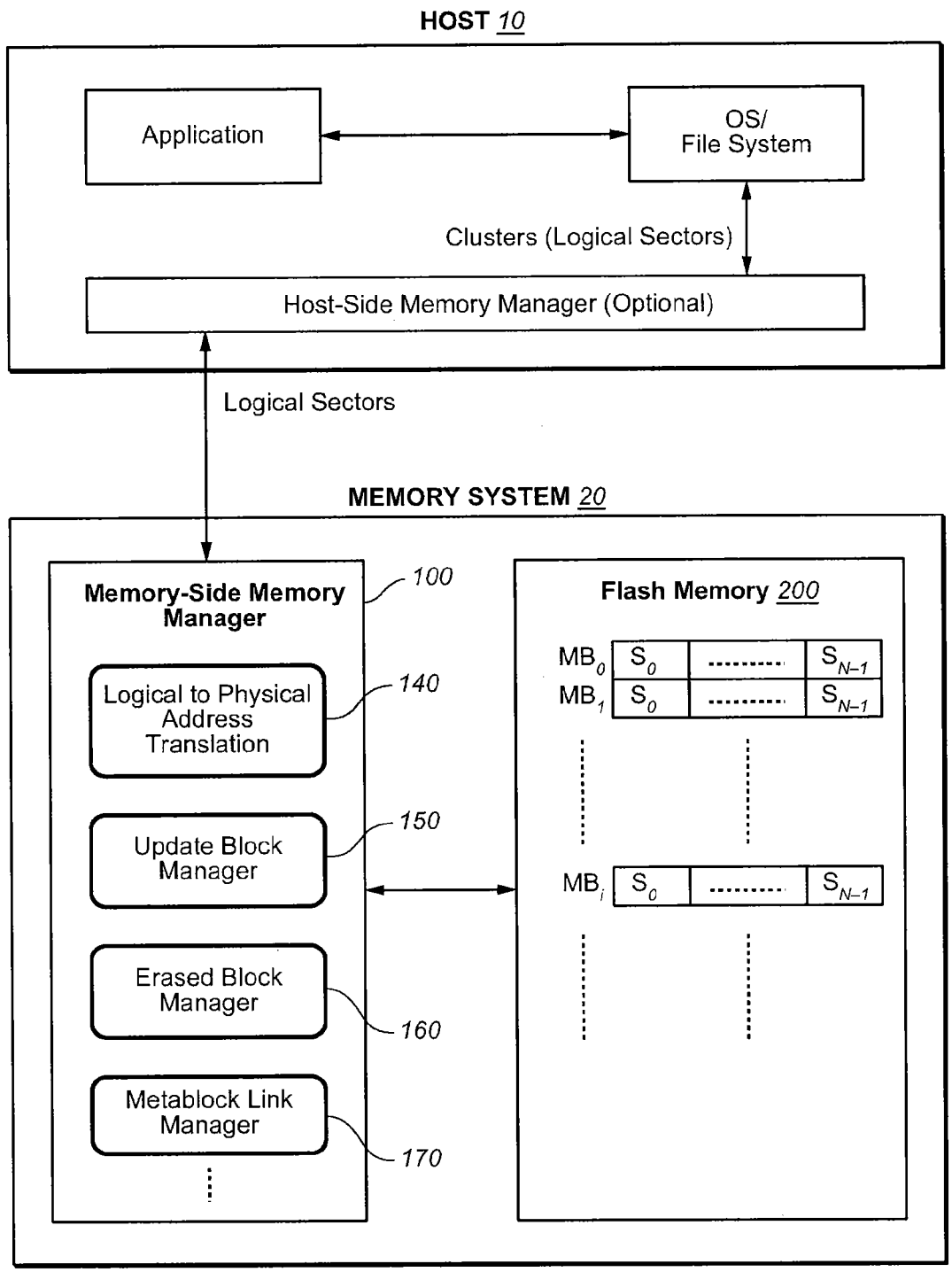
FIG. 2 illustrates the memory being organized into physical groups of sectors (or metablocks) and managed by a memory manager of the controller, according to an embodiment of the invention.

FIG. 2 illustrates the memory being organized into physical groups of sectors (or metablocks) and managed by a memory manager of the controller, according to an embodiment of the invention. The memory 200 is organized into metablocks, where each metablock is a group of physical sectors $S_0, \ldots, S_{N-1}$ that are erasable together.

The host 10 accesses the memory 200 when running an application under a file system or operating system. Typically, the host system addresses data in units of logical sectors where, for example, each sector may contain 512 bytes of data. Also, it is usual for the host to read or write to the memory system in units of logical clusters, each consisting of one or more logical sectors. In some host systems, an optional host-side memory manager (driver) may exist to perform lower level memory management at the host. In most cases during read or write operations, the host 10 essentially issues a command to the memory system 20 to read or write a segment containing a string of logical sectors of data with contiguous addresses.

A memory-side (device-side) memory manager is implemented in the controller 100 of the memory system 20 to manage the storage and retrieval of the data of host logical sectors among metablocks of the flash memory 200. In an embodiment, the memory manager contains a number of software modules for managing erase, read and write operations of the metablocks. The memory manager also maintains system control and directory data associated with its operations among the flash memory 200 and the controller RAM 130.

Figure 3A:
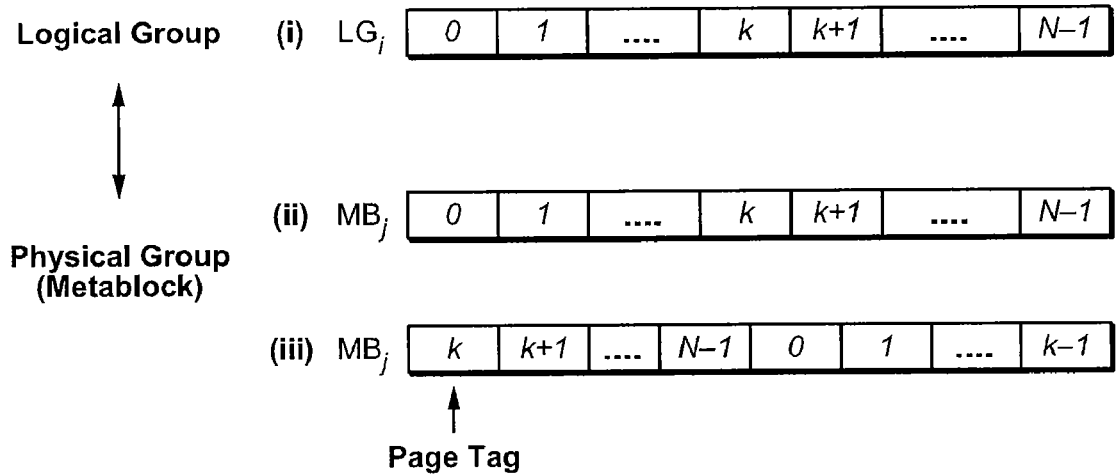
FIGS. 3A(i)-3A(iii) illustrate schematically the mapping between a logical group and a metablock, according to an embodiment of the present invention.

FIGS. 3A(i)-3A(iii) illustrate schematically the mapping between a logical group and a metablock, according to an embodiment of the present invention. The metablock of the physical memory has N physical sectors for storing N logical sectors of data of a logical group. FIG. 3A(i) shows the data from a logical group $LG_i$, where the logical sectors are in contiguous logical order 0, 1, . . . , N−1. FIG. 3A(ii) shows the same data being stored in the metablock in the same logical order. The metablock when stored in this manner is said to be "sequential." In general, the metablock may have data stored in a different order, in which case the metablock is said to be "non-sequential" or "chaotic." In some designs, data is stored sequentially within two or more portions of the block, but there is some discontinuity in logical addresses of data in different portions. In such a design, a limited number of discontinuities in logical addresses may be allowed before the block is considered to be chaotic and is treated as a chaotic block. For example, a single discontinuity dividing the block into two parts, each of which contains sequentially stored data may not cause the block to be treated as chaotic. Such a block may continue to be treated as a sequential block for purposes of managing open sequential and nonsequential blocks.

In a sequential block, there may be an offset between the lowest address of a logical group and the lowest address of the metablock to which it is mapped. In this case, logical sector addresses wrap round as a loop from bottom back to top of the logical group within the metablock. For example, in FIG. 3A(iii), the metablock stores in its first location beginning with the data of logical sector k. When the last logical sector N−1 is reached, it wraps around to sector and finally storing data associated with logical sector k−1 in its last physical sector. In an embodiment, a page tag is used to identify any offset, such as identifying the starting logical sector address of the data stored in the first physical sector of the metablock. Two blocks will be considered to have their logical sectors stored in similar order when they only differ by a page tag.

Figure 3B:
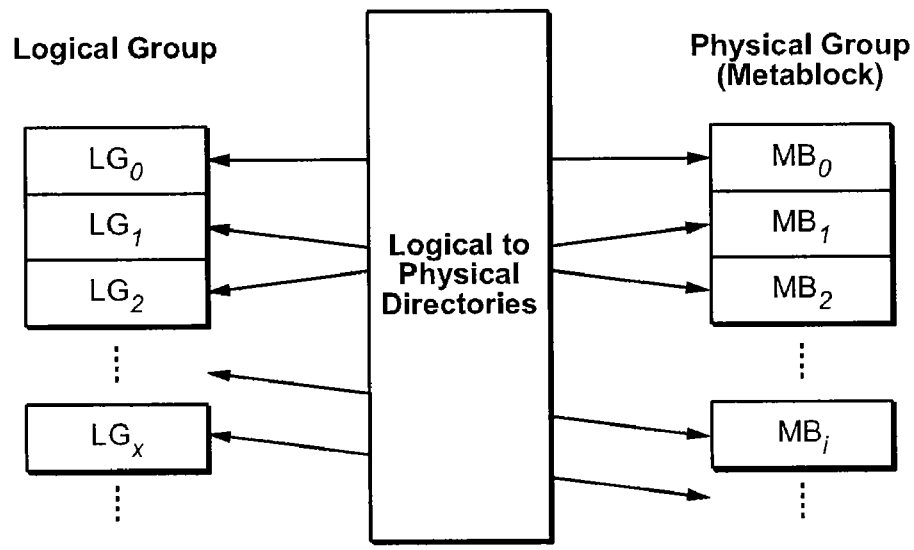
FIG. 3B illustrates schematically the mapping between logical groups and metablocks.

FIG. 3B illustrates schematically the mapping between logical groups and metablocks. Each logical group is mapped to a unique metablock, except for a small number of logical groups in which data is currently being updated. After a logical group has been updated, it may be mapped to a different metablock. The mapping information is maintained in a set of logical to physical directories, which will be described in more detail later.

Other types of logical group to metablock mapping are also contemplated. For example, metablocks with variable size are disclosed in co-pending and co-owned Ser. No. 10/750,157.

One feature of an exemplary system is that it may operate with a single logical partition, and groups of logical sectors throughout the logical address range of the memory system are treated identically. For example, sectors containing system data and sectors containing user data can be distributed anywhere among the logical address space. Alternatively, system data and user data may be treated differently. In one example, system data and user data are stored in different areas of the memory array. In another example, system data is written only to lower pages of Multi Level Cell (MLC) memory, while user data is written to both upper and lower pages.

Figure 4:
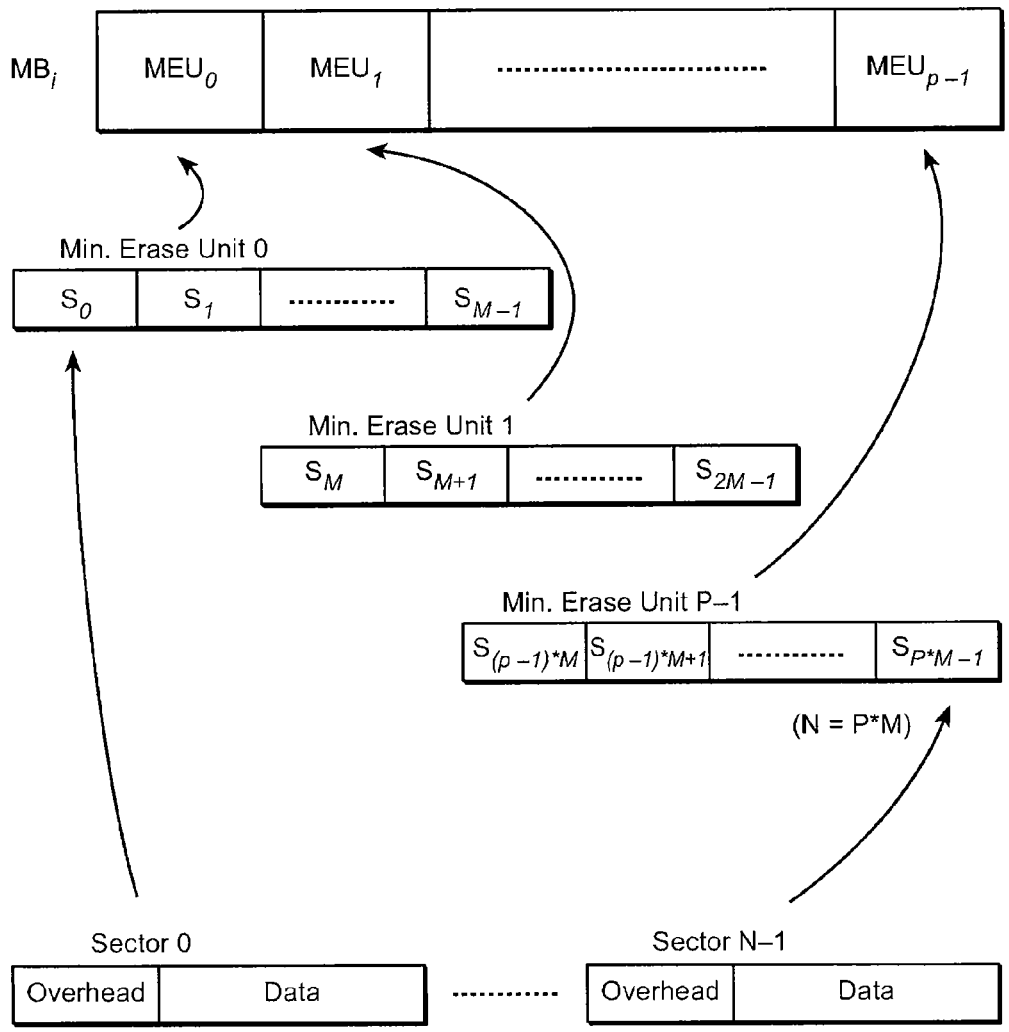
FIG. 4 illustrates the alignment of a metablock with structures in physical memory.

FIG. 4 illustrates the alignment of a metablock with structures in physical memory. Flash memory comprises blocks of memory cells which are erasable together as a unit. Such erase blocks are the minimum unit of erasure of flash memory or minimum erasable unit (MEU) of the memory. The minimum erase unit is a hardware design parameter of the memory, although in some memory systems that support multiple MEUs erase, it is possible to configure a "super MEU" comprising more than one MEU. For flash EEPROM, a MEU may comprise one sector or may comprise multiple sectors. In the example shown, it has M sectors. In an embodiment, each sector can store 512 bytes of data and has a user data portion and a header portion for storing system or overhead data. If the metablock is constituted from P MEUs, and each MEU contains M sectors, then, each metablock will have N=P*M sectors.

The metablock represents, at the system level, a group of memory locations, e.g., sectors that are erasable together. The physical address space of the flash memory is treated as a set of metablocks, with a metablock being the minimum unit of erasure. Within this specification, the terms "metablock" and "block" are used synonymously to define the minimum unit of erasure at the system level for media management, and the term "minimum erase unit" or MEU is used to denote the minimum unit of erasure of flash memory.

In order to maximize programming speed and erase speed, parallelism is exploited by arranging for multiple pages of information, located in multiple MEUs, to be programmed in parallel, and for multiple MEUs to be erased in parallel.

In flash memory, a page is a grouping of memory cells that may be programmed together in a single operation. A page may comprise one or more sectors. Also, a memory array may be partitioned into more than one plane, where only one MEU within a plane may be programmed or erased at a time. Finally, the planes may be distributed among one or more memory chips.

In flash memory, the MEUs may comprise one or more pages. MEUs within a flash memory chip may be organized in planes. Since one MEU from each plane may be programmed or erased concurrently, it is expedient to form a multiple MEU metablock by selecting one MEU from each plane.

Figure 5:
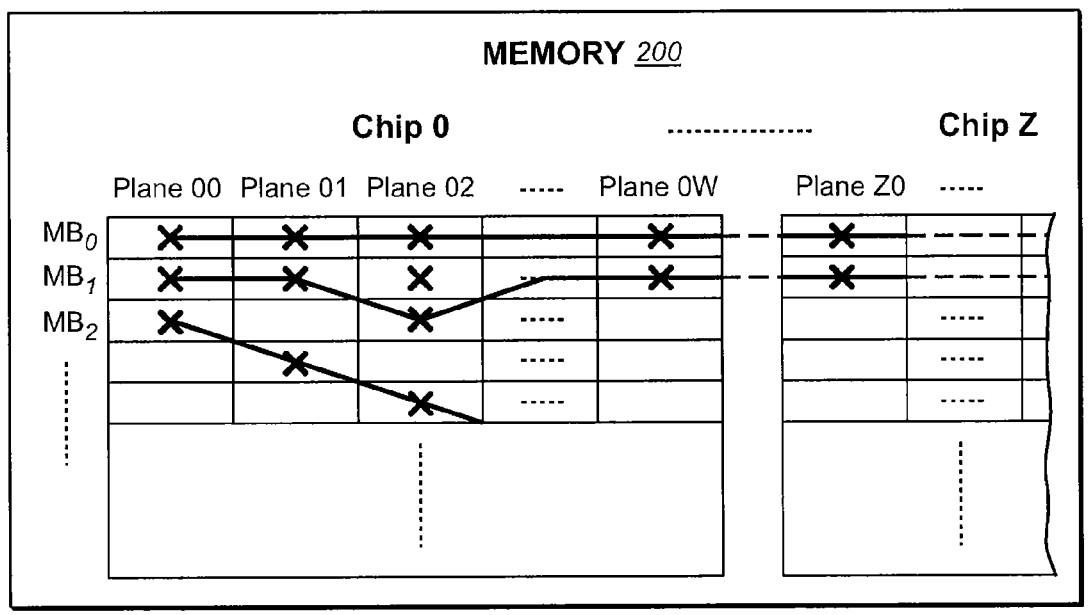
FIG. 5 illustrates metablocks being constituted from linking of minimum erase units of different planes.

FIG. 5 illustrates metablocks being constituted from linking of minimum erase units of different planes. Each metablock, such as MB0, MB1, . . . , is constituted from MEUs from different planes of the memory system, where the different planes may be distributed among one or more chips. The metablock link manager 170 shown in FIG. 2 manages the linking of the MEUs for each metablock. Each metablock is configured during an initial formatting process, and retains its constituent MEUs throughout the life of the system, unless there is a failure of one of the MEUs. The linking and re-linking of MEUs into metablocks is also disclosed in co-pending and co-owned U.S. patent application Ser. No. 10/750,157.

Figure 6:
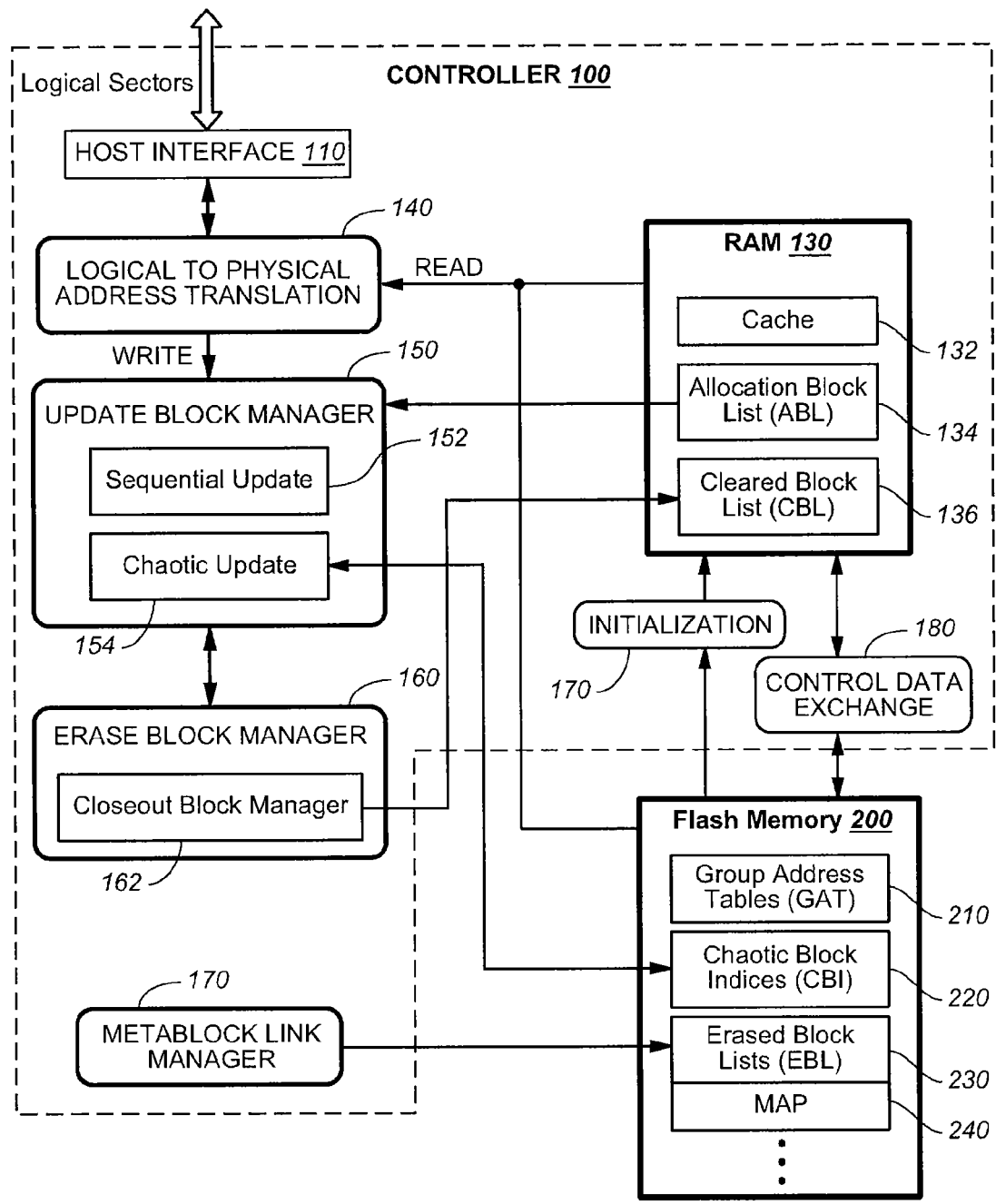
FIG. 6 is a schematic block diagram of the metablock management system as implemented in the controller and flash memory.

FIG. 6 is a schematic block diagram of the metablock management system as implemented in the controller and flash memory. The metablock management system comprises various functional modules implemented in the controller 100 and maintains various control data (including directory data) in tables and lists hierarchically distributed in the flash memory 200 and the controller RAM 130. The function modules implemented in the controller 100 includes an interface module 110, a logical-to-physical address translation module 140, an update block manager module 150, an erase block manager module 160 and a metablock link manager 170.

The interface 110 allows the metablock management system to interface with a host system. The logical to physical address translation module 140 maps the logical address from the host to a physical memory location. The update block Manager module 150 manages data update operations in memory for a given logical group of data. The erased block manager 160 manages the erase operation of the metablocks and their allocation for storage of new information. A metablock link manager 170 manages the linking of subgroups of minimum erasable blocks of sectors to constitute a given metablock.

During operation the metablock management system generates and works with control data such as addresses, control and status information. Since much of the control data tends to be frequently changing data of small size, it may not be readily stored and maintained efficiently in a flash memory with a large block structure. A hierarchical and distributed scheme is employed to store the more static control data in the nonvolatile flash memory while locating the smaller amount of the more varying control data in controller RAM for more efficient update and access. In the event of a power shutdown or failure, the scheme allows the control data in the volatile controller RAM to be rebuilt quickly by scanning a small set of control data in the nonvolatile memory.

The non-volatile flash memory 200 stores the bulk of control data that are relatively static. This includes group address tables (GAT) 210, chaotic block indices (CBI) 220, erased block lists (EBL) 230 and MAP 240. The GAT 210 keeps track of the mapping between logical groups of sectors and their corresponding metablocks. The mappings do not change except for those undergoing updates. The CBI 220 keeps track of the mapping of logically non-sequential sectors during an update. The EBL 230 keeps track of the pool of metablocks that have been erased. MAP 240 is a bitmap showing the erase status of all metablocks in the flash memory.

The volatile controller RAM 130 stores a small portion of control data that are frequently changing and accessed. This includes an allocation block list (ABL) 134 and a cleared block list (CBL) 136. The ABL 134 keeps track of the allocation of metablocks for recording update data while the CBL 136 keeps track of metablocks that have been deallocated and erased. In one embodiment, the RAM 130 acts as a cache for control data stored in flash memory 200.

The update block manager 150 (shown in FIGS. 2 and 6) handles the update of logical groups. According to one aspect of the invention, each logical group of sectors undergoing an update is allocated a dedicated update metablock for recording the update data. In an embodiment, any segment of one or more sectors of the logical group will be recorded in the update block. An update block can be managed to receive updated data in either sequential order or non-sequential (also known as chaotic) order. A chaotic update block allows sector data to be updated in any order within a logical group, and with any repetition of individual sectors. In particular, a sequential update block can become a chaotic update block, without need for relocation of any data sectors. No predetermined allocation of blocks for chaotic data update is required; a non-sequential write at any logical address is automatically accommodated. Thus, there is no special treatment whether the various update segments of the logical group is in logical sequential or non-sequential order. The generic update block will simply be used to record the various segments in the order they are requested by the host. For example, even if host system data or system control data tends to be updated in chaotic fashion, regions of logical address space corresponding to host system data do not need to be treated differently from regions with host user data.

Data of a complete logical group of sectors may be stored in logically sequential order in a single metablock. In this way, the index to the stored logical sectors is predefined. When the metablock stores all the sectors of a given logical group in a predefined order it is said to be "intact." As for an update block, when it eventually fills up with update data in logically sequential order, then the update block will become an updated intact metablock that readily replaces the original metablock. On the other hand, if the update block fills up with update data in a logically different order from that of the intact block (other than a simple offset indicated by a page tag), the update block is a non-sequential or chaotic update block and the out of order segments must be further processed so that eventually the update data of the logical group is stored in the same order as that of the intact block. The further processing involves consolidating the updated sectors in the update block with unchanged sectors in the original block into yet another update metablock. The consolidated update block will then be in logically sequential order and can be used to replace the original block. Under some predetermined condition, the consolidation process is preceded by one or more compaction processes. The compaction process simply re-records the sectors of the chaotic update block into a replacing chaotic update block while eliminating any duplicate logical sector that has been rendered obsolete by a subsequent update of the same logical sector.

The update scheme allows for multiple update threads running concurrently, up to a predefined maximum. Each thread is a logical group undergoing updates using its dedicated update metablock. Alternately, a dedicated zone based on a structure of a finer granularity than a metablock can be used.

When data belonging to a logical group is first updated, a metablock is allocated and dedicated as an update block for the update data of the logical group. The update block is allocated when a command is received from the host to write a segment of one or more sectors of the logical group for which an existing metablock has been storing all its sectors intact. For the first host write operation, a first segment of data is recorded on the update block. Since each host write is a segment of one or more sector with contiguous logical address, it follows that the first update is always sequential in nature. In subsequent host writes, update segments within the same logical group are recorded in the update block in the order received from the host. A block continues to be managed as a sequential update block whilst sectors updated by the host within the associated logical group remain logically sequential. All sectors updated in this logical group are written to this sequential update block, until the block is either closed or converted to a chaotic update block.

Figure 7A:
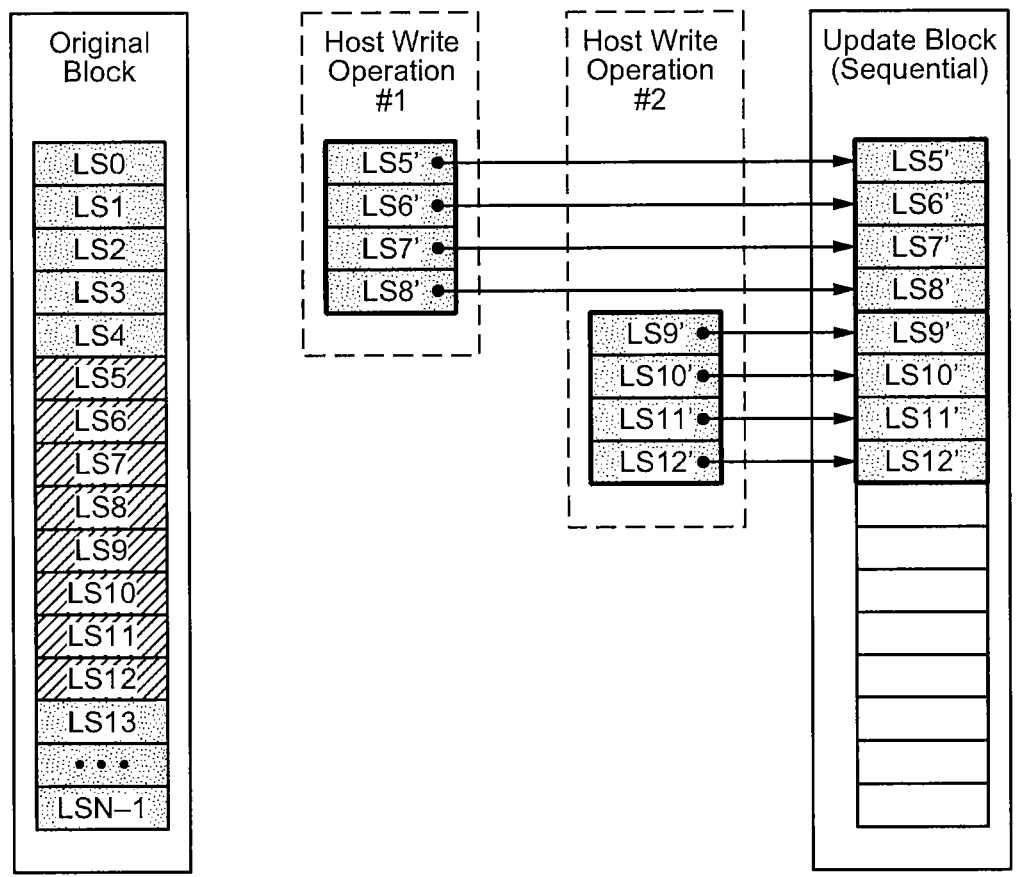
FIG. 7A illustrates an example of sectors in a logical group being written in sequential order to a sequential update block.

FIG. 7A illustrates an example of sectors in a logical group being written in sequential order to a sequential update block as a result of two separate host write operations, whilst the corresponding sectors in the original block for the logical group become obsolete. In host write operation #1, the data in the logical sectors LS5-LS8 are being updated. The updated data as LS5'-LS8' are recorded in a newly allocated dedicated update block.

For expediency, the first sector to be updated in the logical group is recorded in the dedicated update block starting from the first physical sector location. In general, the first logical sector to be updated is not necessarily the logical first sector of the group, and there may therefore be an offset between the start of the logical group and the start of the update block. This offset is known as page tag as described previously in connection with FIG. 3A. Subsequent sectors are updated in logically sequential order. When the last sector of the logical group is written, group addresses wrap around and the write sequence continues with the first sector of the group.

In host write operation #2, the segment of data in the logical sectors LS9-LS12 are being updated. The updated data as LS9'-LS12' are recorded in the dedicated update block in a location directly following where the last write ends. It can be seen that the two host writes are such that the update data has been recorded in the update block in logically sequential order, namely LS5'-LS12'. The update block is regarded as a sequential update block since it has been filled in logically sequential order. The update data recorded in the update block obsoletes the corresponding ones in the original block.

Chaotic update block management may be initiated for an existing sequential update block when any sector updated by the host within the associated logical group is logically non-sequential. A chaotic update block is a form of data update block in which logical sectors within an associated logical group may be updated in any order and with any amount of repetition. It is created by conversion from a sequential update block when a sector written by a host is logically non-sequential to the previously written sector within the logical group being updated. All sectors subsequently updated in this logical group are written in the next available sector location in the chaotic update block, whatever their logical sector address within the group.

Figure 7B:
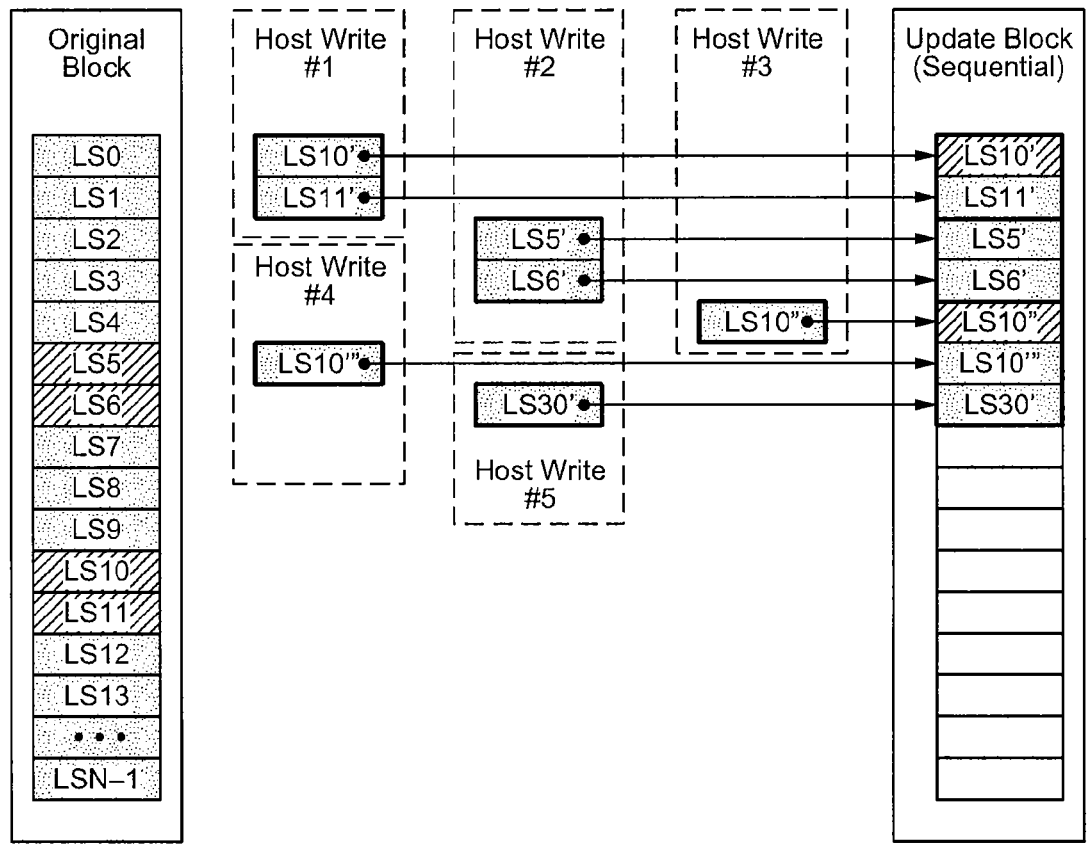
FIG. 7B illustrates an example of sectors in a logical group being written in chaotic order to a chaotic update block.

FIG. 7B illustrates an example of sectors in a logical group being written in chaotic order to a chaotic update block as a result of five separate host write operations, whilst superseded sectors in the original block for the logical group and duplicated sectors in the chaotic update block become obsolete. In host write operation #1, the logical sectors LS10-LS11 of a given logical group stored in an original metablock is updated. The updated logical sectors LS10'-LS11' are stored in a newly allocated update block. At this point, the update block is a sequential one. In host write operation #2, the logical sectors LS5-LS6 are updated as LS5'-LS6' and recorded in the update block in the location immediately following the last write. This converts the update block from a sequential to a chaotic one. In host write operation #3, the logical sector LS10 is being updated again and is recorded in the next location of the update block as LS10". At this point LS10" in the update block supersedes LS10' in a previous recording which in turn supersedes LS10 in the original block. In host write operation #4, the data in the logical sector LS10 is again updated and is recorded in the next location of the update block as LS10'''. Thus, LS10''' now the latest and only valid data for the logical sector LS10. In host write operation #5, the data in logical sector LS30 is being updated and recorded in the update block as LS30'. Thus, the example illustrates that sectors within a logical group can be written in a chaotic update block in any order and with any repetition.

Open Block management

As described above, a limited number of update blocks may be maintained in an open condition so that they are available for storage of additional data. In general, maintaining a large number of open update blocks requires a large amount of resources to keep track of data stored within the open blocks. On the other hand, maintaining a small number of open blocks may mean that there are a large number of writes to blocks that are not open requiring closing of an open block and opening of the block being written. Such high turnover of open blocks may impact performance. Therefore, it is desirable to keep the number of open blocks below a limit and to choose the blocks that remain open carefully so that a high number of writes are to open blocks.

The open update blocks may include sequential update blocks and nonsequential (chaotic) update blocks. In some cases, the total number of open update blocks is split between sequential and chaotic update blocks so that they are separately limited in number. In this way, there are generally both open sequential blocks and open chaotic blocks available. There may be different replacement rules for sequential blocks and chaotic blocks. Examples of this type of open block management scheme are provided in U.S. patent application Ser. No. 11/532,467, entitled, "Non-volatile memory with class-based update block replacement rules."

The following block management schemes may be used in any suitable memory system, including the memory system described above and similar flash memory systems. Separate schemes are described for chaotic blocks and sequential blocks that efficiently use the limited numbers of open blocks of each type. These schemes may be used individually or in combination in a memory system.

Open Chaotic Block Management

In an exemplary chaotic block management scheme, open chaotic blocks are chosen according to two factors, recency of use and frequency of use. The composition of the open chaotic blocks (i.e. the fractions of the total number of open chaotic blocks that are recently used and frequently used) is managed to try to keep a target composition. The target composition is adjusted according to the pattern of write commands received so that the chaotic block management scheme adapts to the pattern of write commands, increasing the chances of writes to open chaotic blocks. In particular, where the pattern of write commands includes a high number of writes to recently written blocks, the number of recently written blocks that are kept open is increased (and the number of frequently written blocks that are kept open is decreased accordingly). Where the pattern of write commands includes a high number of writes to frequently written blocks, the number of frequently written blocks that are kept open is increased (and the number of recently written blocks that are kept open is decreased accordingly).

Figure 8:
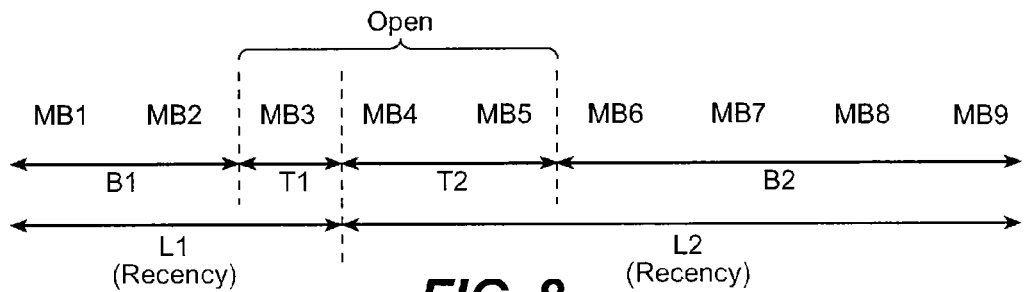
FIG. 8 shows two lists of nonsequential update blocks, list L1 having blocks selected because of a single recent nonsequential write to each block and list L2 having blocks selected because of two or more writes to each block, with open nonsequential update blocks being selected from L1 and L2.

In a particular example shown in FIG. 8, metablocks MB1-MB9 are maintained in two lists, L1 and L2, where L1 includes metablocks that are recently written and L2 includes blocks that are frequently written. In this example, blocks in L1 are blocks that have had one chaotic write most recently (though in other examples, a list like L1 may contain blocks selected on the basis of two or more recent nonsequential writes). In other words, blocks MB1-MB3 were each sequential prior to a recent nonsequential write, which caused them to be placed in L1. Thus, blocks in L1 are selected on the basis of recency of a nonsequential write. Blocks in L2 are blocks that have experienced two or more nonsequential writes most recently. In other words, MB4-MB9 had each been written nonsequentially at least once prior to a recent nonsequential write which caused them to be placed in L2. Thus, blocks in L2 are selected on the basis of frequency of chaotic writes as determined from at least two chaotic writes to a block. Within each list L1, L2, metablocks are arranged in order of their last nonsequential write, with the most recently written blocks nearest to the line between L1 and L2. Thus, in L1 MB3 is the most recently written block, followed by MB2 and MB1. In L2, MB4 is the most recently written block, followed by MB5, MB6 etc. Only a limited number of chaotic update blocks are maintained as open blocks in L1 and L2. Within L1 and L2, blocks are ordered according to the most recent write, with the least recently written block being pushed out of a list when necessary to keep the number of blocks in the list within its limit. The least recently written block may be considered the Least Recently Used (LRU) block. In the example of FIG. 8, just three (3) blocks MB3-MB5 are open. Thus, both L1 and L2 are divided between open blocks and blocks that have recently been closed. Open update blocks in L1 are labeled as T1 and closed update blocks in L1 are labeled as B1. Similarly, open update blocks in L2 are labeled as T2 and closed update blocks in L2 are labeled as B2. T1 and T2 contain all currently open update blocks while B1 and B2 represent histories of blocks which were recently in T1 and T2 respectively. In the example shown, the total number of open chaotic update blocks (C) is three (3), the number of blocks in L1 is also three (3), or C, and the number of blocks in L2 is six (6), or 2C. Other numbers of blocks may also be used in these lists.

Figure 9A:
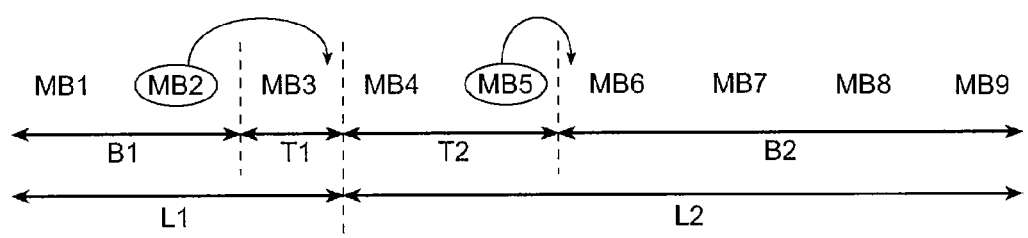
FIG. 9A shows an example of a block in L1 being written and a block in L2 being closed.
Figure 9B:
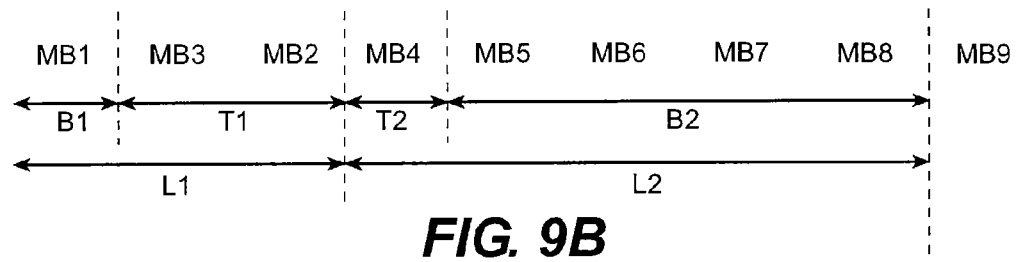
FIG. 9B shows the result of the write and block close operations of FIG. 9A.

One aspect of the example shown is the adaptive nature of the chaotic block management scheme. In particular, the management scheme adjusts the number of blocks from L1 that are kept open when a pattern of writes to blocks in L1 occurs. FIG. 9A shows an example where block MB2 is written. As a result of this write, MB2 is moved to the top of L1 (top of T1) and is maintained as an open block. In order to keep the number of open blocks below the maximum number, another open block must be closed. In this case, MB5 is closed (moved from T2 to B2) as shown, though in other cases MB3 could be closed. In order to keep the number of blocks in L2 within the maximum permitted number, MB9 is removed from L2. The result of these operations is shown in FIG. 9B, where MB2 is at the top of T1, MB5 is in B2, and MB9 is no longer in L2. While this example shows a write to a block in B1, if the write occurred to a block in T1, the block would go to the top of L2 (top of T2). For example, if MB3 was accessed, it would go to the top of T2, causing T1 to be empty, without requiring any block to be closed.

In this example, a target number of blocks in T1 (target_T1) is maintained and is used to determine which open block gets closed when a block closure is required. Target_T1 may be modified when a write occurs so that the target provides a mechanism for adaptive block management. In particular, where the block that is written is in L1, target_T1 may be increased so that more blocks from L1 are kept open, and correspondingly fewer blocks from T2 are kept open. When a block in L2 is written, target_T1 may be decreased so that fewer blocks from L1 are kept open and correspondingly more blocks from T2 are kept open.

One exemplary subroutine for the case where the block (x) being written is in B1 is as follows:

| | |
|---|---|
| Replace: | If T1 is not empty and |
| | (($x \in B2$ and $|T1| = $ target_T1) or ($|T1| > $ target_T1)), |
| | or ($|T1| = C$), |
| | Then move LRU of T1 to B1 |
| | Else, move lowest entry of T2 to top of B2 |
| Adapt target_T1: | target_T1 = min{c, target_T1+max[B1/B2, 1]} |
| Move x to the top of T1 | |

Applying the above subroutine to the case shown in FIG. 9A, where target_T1 is initially one (1). Because x∉B2, T1 is not >target_T1, and |T1|≠C, the LRU of T2 (MB5) is closed by moving it to B2, as shown. Next, target_T1 is increased to two (2) because B1/B2=½, so max[B1/B2, 1]=1.

Figure 10A:
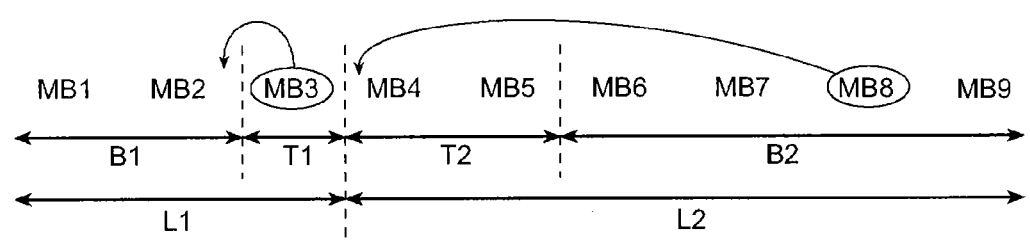
FIG. 10A shows an example of a block in L2 being written and a block in L1 being closed.
Figure 10B:
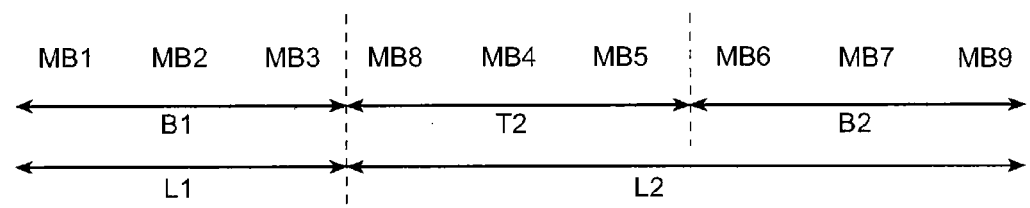
FIG. 10B shows the result of the write and block close operations of FIG. 10A.

FIG. 10A shows the situation where a write occurs to block MB8 which is in B2. Because MB8 is already in list L2, it is moved to the top of L2 (to the top of T2). As a result, at least one block must be closed to keep the number of open blocks (T1+T2) within the maximum number (C). In this case, MB3 is closed (moved from T1 to B1) so that T1 is empty as shown in FIG. 10B. As shown, all open chaotic blocks are from L2 at this point. One exemplary routine for the case where the block being written (x) is in B2 is as follows:

```
Replace (as above):   If T1 is not empty and
                      ((x ∈ B2 and |T1| = target_T1) or
                      (|T1| > target_T1)),
                      or (|T1| =C),
                      Then move lowest entry of T1 to B1
                      Else, move lowest entry of T2 to top of B2
Adapt target_T1:      target_T1 = max{0, target_T1−max[B1/B2, 1]}
Move x to the top of T2
```

Applying this subroutine to the case shown in FIG. 10A, with target_T1 initially at one (1). Here, x∈B2 and |T1|=target_T1, so the lowest entry of T1 (MB3) is closed by moving it to B1 as shown. Next, target_T1 is decreased to zero (0) because B1/B2=½, so max[B1/B2, 1]=1

Figure 11A:
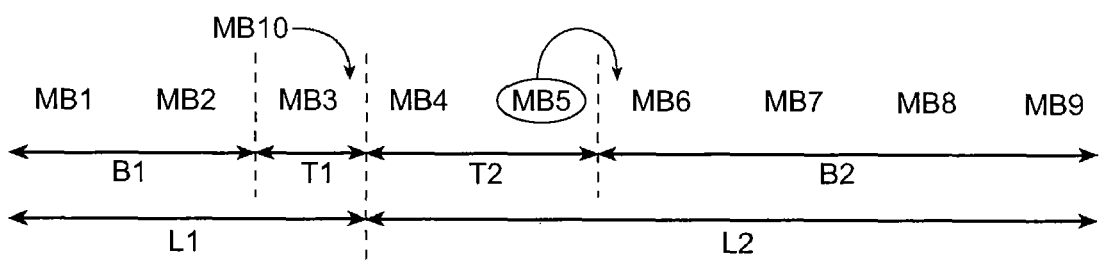
FIG. 11A shows an example of a write to a block that is not in either L1 or L2, which causes a block in L2 to be closed.
Figure 11B:
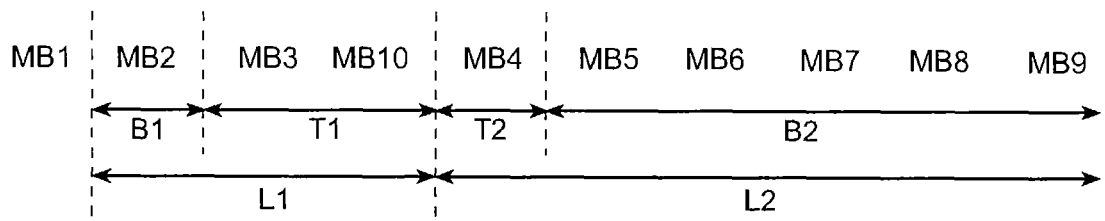
FIG. 11B shows the result of the write and block close operations of FIG. 11A.

FIG. 11A shows the case where the block that is written, MB10, is not in L1 or L2. In this case, this is the first nonsequential write to MB10, so MB10 goes to the top of L1 (and thus to the top of T1). In the example shown in FIGS. 11A, 1B, this results in block MB5 being closed and block MB1 being pushed out of L1. An exemplary subroutine for blocks that are not in L1 or L2 is as follows:

```
If |L1| = C
    If |T1| < C, then remove LRU (B1) and
        Replace (as above):    If T1 is not empty and
                               ((x ∈ B2 and |T1| = target_T1) or
                               (|T1| > target_T1)),
                               or (|T1| =C),
                               Then move lowest entry of T1 to B1
                               Else, move lowest entry of T2 to top of B2
    Else, move LRU (T1) to MRU of B1.
If |L1| < C and |L1| + |L2| ≥ 3C, then
    delete LRU (B2) and
    Replace (as above):    If T1 is not empty and
                           ((x ∈ B2 and |T1| = target_T1) or
                           (|T1| > target_T1)),
                           or (|T1| =C),
                           Then move lowest entry of T1 to B1
                           Else, move lowest entry of T2 to top of B2
Put x at the top of T1.
```

Applying this subroutine to the case shown in FIG. 11A, |L1|=C, and |T1|<C, so LRU (B1), in this case MB1, is removed from B1. T1 is not empty, x∉B2, |T1| is not >target_T1 and |T1|≠C, so the lowest entry of T2 (MB5) is closed by moving it to B2.

Where a write occurs to a block that is already open, i.e. to a block in T1 or T2, the block is generally moved to the top of T2 and no block close is necessary. However, an exception may be made where the write appears to be aligned to a cluster boundary (or other predefined boundary), and the previous write was for data having a length corresponding to an integer number of clusters (or other predefined unit). For example, in one memory design, any write that starts on a 32 KB boundary, and where the write, or the previous write, contains an integer number of 32 KB units, the block may not be added to T2. In particular, such a pattern of writes is consistent with storage of file data and does not indicate storage of data management information such as FAT and directory information. It may be better not to treat such blocks as frequently written. Therefore, such a block may not be moved to the top of T2. An exemplary subroutine for a block (x) that is in T1 or T2 is as follows:

Move x to the top of T2 if (a) the nonsequential write to x is a backward jump with respect to the previous command (i.e. a write to an address that is lower than or equal to the last written address in the logical group), or (b) the write is a forward jump (i.e. a write to an address that is higher than the last written address in the logical group and is not sequential to the last written address) that exceeds a predefined threshold.

Do not move x to the top of T2 if the nonsequential write to x falls on a 32 KB boundary and the previous write command length was a multiple of 32 KB.

The combination of the above subroutines provides an exemplary scheme for managing open chaotic blocks when different write commands occur. Alternative schemes may use one or more of the above subroutines to obtain some benefits without using all of the subroutines. While the above scheme uses particular criteria to identify recently written blocks and frequently written blocks, other criteria may also be used. For example, recently written blocks may be selected on the basis of more than one nonsequential write (e.g. two writes) and frequently written blocks may be selected on the basis of more than two writes (e.g. three writes). In other examples, recently written blocks may be selected on the basis of some other number of writes, with frequently written blocks selected on the basis of some higher number of writes.

Open Sequential Block Management

Sequential blocks may be managed according to another scheme that is different to the scheme used for nonsequential blocks. A sequential block management scheme may be provided in combination with any suitable nonsequential block management scheme and is not limited to operating with a scheme such as described above.

In exemplary open sequential block management schemes, open sequential update blocks are divided into two lists of blocks, those that are expected to remain sequential and those that are not expected to remain sequential. Each of these lists may be ordered according to the recency of the last write command with the LRU of one of the lists being pushed out when necessary.

The determination as to whether a particular block is expected to remain sequential or not may be made on the basis of a pattern of write commands. For example, where a write command starts at a predetermined boundary, this may be taken to indicate that the block is likely to remain sequential. For example, where the write command starts at a cluster boundary, or similar data boundary, this may indicate that the write is saving file data and that additional file data is likely to be written sequentially. Where the write command does not start at a cluster boundary or similar data boundary, this may indicate that the write is saving control data such as FAT or directory information and that any further write commands are likely to be nonsequential. As discussed above, in some memory systems, data boundaries are at 32 KB intervals and data may analyzed to check for alignment with such boundaries to determine if the block being written is likely to remain sequential.

In addition to looking at the alignment of the start of a write command to predefined data boundaries, the length of write commands may be analyzed to determine if a particular block is likely to remain sequential. For example, if the length of a write command is an integer number of clusters, or an integer number of other predefined units (e.g. 32 KB units), then this may indicate that the write is a write of file data and that the block is likely to remain sequential. However, if the write command is not an integer number of clusters or other predefined units, this may indicate that the block is not likely to remain sequential. In some cases, the length of a write command may be known when the memory system starts to execute the command. However, in some memory systems, the length of the write command is not provided initially so that the memory system starts to execute the write command before the length of the data is known. In such a system, the length of one or more previous write commands to the same block may be analyzed to determine if the block is likely to remain sequential.

Figure 12:
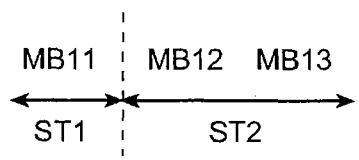
FIG. 12 shows open sequential metablocks that are divided into blocks that are expected to remain sequential, sT1, and blocks that are not expected to remain sequential, sT2.

FIG. 12 shows an example where three metablocks are maintained as open sequential blocks in two lists sT1 and sT2. In other examples, different numbers of open sequential blocks may be maintained. List sT1 contains block MB11, which is the most recently written sequential block that is expected to remain sequential and sT2 contains blocks MB12, MB13, which are the most recently written sequential blocks that are not expected to remain sequential.

An exemplary scheme for managing open sequential update blocks, with one list sT1 for blocks that are expected to remain sequential and another list sT2 for blocks that are not expected to remain sequential when a sequential write occurs to block x, is as follows:

---

If x is open sequential block (i.e. x ∈ sT1 or sT2)
    If ExpectSequential* = True, then move x to top of sT1,
    else move x to top of sT2
If x is not an open sequential block (i.e. x ∉ sT1 or sT2)
        Replace: if any sequential update block available
        (i.e. sT1+sT2 not full), do nothing and exit Replace
        else, if sT1 is not empty, remove LRU of sT1,
        if sT1 empty remove LRU of sT2
    If ExpectSequential* = True, move x to the top of sT1,
    else move x to top of sT2
*ExpectSequential = True if previous write to block x begins at a predefined data boundary, otherwise, ExpectSequential = False

---

Note that this scheme treats a block as likely to remain sequential (ExpectSequential=True) based only on the alignment of the previous write with a data boundary. However, in other examples, the alignment of the present write command, or other write commands, may also be taken into account. Also, the length of the previous write command or write commands may be considered, and if it is known, the length of the present write command may be considered.

It should be noted that a block may be maintained as a sequential block even if there is some gap between write commands. For example, if the gap between write commands is less than a threshold amount, then the gap may be padded with copied data so that the block remains sequential. Thus, a block may be maintained as a sequential block even if all write commands to the block are not perfectly sequential.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain embodiments, it is understood that the invention is entitled to protection within the full scope of the appended claims.

What is claimed is:

1. A method of selecting blocks to close in a block-erasable nonvolatile memory, comprising;
    maintaining a first list of update blocks containing nonsequentially stored data, each update block of the first list individually being added to the first list after one recent nonsequential write operation to such update block, the first list of update blocks listing at least one update block that is in the closed condition in the block-erasable nonvolatile memory;
    maintaining a second list of update blocks containing nonsequentially stored data, each update block of the second list individually being added to the first list after two or more frequent nonsequential write operations to such update block, the second list of update blocks listing at least one update block that is in the closed condition in the block-erasable nonvolatile memory;
    maintaining a limited number of open nonsequential update blocks that contain recently written valid data and are available for programming of additional data, the plurality of open nonsequential update blocks each being listed in the first or second lists; and
    wherein the limited number of open nonsequential update blocks is maintained by decreasing the number of open nonsequential update blocks of the first list in response to an increase in the number of open nonsequential update blocks of the second list and by decreasing the number of open nonsequential update blocks of the second list in response to an increase in the number of open nonsequential update blocks of the first list.

2. The method of claim 1 wherein the number of open nonsequential update blocks of the first and second lists changes in response to a pattern of nonsequential memory writes.

3. The method of claim 1 wherein the number of open nonsequential update blocks of the first and second lists is updated when a block in the first or second list is nonsequentially written.

4. The method of claim 3 wherein the number of open nonsequential update blocks of the first and second lists is updated to have more blocks from the first list in response to a nonsequential write to an update block of the first list and the number of open nonsequential update blocks of the first and second lists is updated to have more update blocks from the second list in response to a nonsequential write to an update block of the second list.

5. The method of claim 1 wherein the first list is ordered according to how recently update blocks of the first list were last written, more recently written update blocks of the first list maintained in the plurality of open nonsequential update blocks, and less recently written blocks of the first list maintained in a recently written history list.

6. The method of claim 5 further comprising, in response to a write command directed to a first update block of the recently written history list, selecting a second block from the plurality of open nonsequential update blocks for a block close operation that removes the second block from the plurality of open nonsequential update blocks and precludes further programming of the second block without a block erase.

7. The method of claim 6 wherein the first update block is moved to the top of the first list in response to the write command.

8. The method of claim 1 wherein the second list is ordered according to how frequently update blocks of the second list were last written, more frequently written update blocks of the second list maintained in the plurality of open nonsequential update blocks, and less frequently written update blocks of the second list maintained in a frequently written history list.

9. The method of claim 8 further comprising, in response to a write command directed to a first update block of the frequently written history list, selecting a second update block from the plurality of open nonsequential update blocks for a block close operation that removes the second update block from the plurality of open nonsequential update blocks and precludes further programming of the second update block without a block erase.

10. The method of claim 9 wherein the first update block is moved to the top of the second list in response to the write command.

11. The method of claim 1 further comprising, in response to one or more nonsequential write commands directed to a third update block of the first list, moving the third update block to the second list.

12. The method of claim 1 further comprising:
maintaining a third list of update blocks containing only sequentially stored data, each update block of the third list being identified as likely to remain sequential based on a first pattern of writing data;
maintaining a fourth list of update blocks containing only sequentially stored data, each update block of the fourth list being identified as unlikely to remain sequential based on a second pattern of writing data; and
maintaining a plurality of open sequential blocks that are available for programming of additional data, the plurality of open sequential blocks each individually listed in the third list or the fourth list.

13. A method of selecting blocks to close in a block-erasable nonvolatile memory that maintains a limited number of blocks in an open condition to accept additional programming and maintains other blocks in a closed condition, comprising:
maintaining a first list of update blocks containing sequentially stored data, each block in the first list being identified as likely to remain sequential based on a first pattern of writing data;
maintaining a second list of update blocks containing sequentially stored data, each block in the second list being identified as unlikely to remain sequential based on a second pattern of writing data, wherein the first pattern differs from the second pattern;
maintaining a plurality of open sequential update blocks that contain valid data and are available for programming of additional data, the plurality of open sequential blocks each being listed in the first list or the second list; and
maintaining each update block of the first list as sequential so that if there is a data gap between write commands that is less than a predetermined threshold, padding such data gap with copied data so that the update block remains sequential.

14. The method of claim 13 further comprising selecting a block from the plurality of open sequential update blocks for a close operation, the selected block being the least recently written block of the first list, unless the first list is empty, in which case the selected block is the least recently written block of the second list.

15. The method of claim 13 wherein the first pattern of writing includes a write of a portion of data that starts at a predefined boundary location from a set of predefined boundary locations, and the second pattern of writing consists of a write of a portion of data that does not start at one of the predefined boundary locations.

16. The method of claim 15 wherein the predefined boundary locations are cluster boundary locations.

17. The method of claim 13 wherein the first pattern of writing includes a write of a portion of data having a length that is an integer number of groups of sectors, each group of sectors containing an equal predetermined number of sectors, and the second pattern of writing consists of a write of a portion of data having a length that is not an integer number of groups of sectors each containing the predetermined number of sectors.

18. The method of claim 17 wherein the predefined number of sectors is the number of sectors in a cluster.

19. A method of managing a block-erasable nonvolatile memory array that includes a number of individually erasable blocks comprising:
maintaining a first plurality of blocks as closed blocks, which individually contain data and are not available for programming of further data without erase;
maintaining a second plurality of blocks as open sequential update blocks that individually contain data stored in a physical order that reflects a logical order of the data, each open sequential update block being available for programming of further data; and
maintaining a third plurality of blocks as open chaotic update blocks that individually contain data that is stored in a physical arrangement that does not reflect a logical order, the third plurality of blocks including up to a predetermined maximum number of blocks, the third plurality of blocks selected to include a plurality of update blocks that each comprise a frequently written update block or a recently written update block, each frequently written update block selected on the basis of at least two nonsequential writes to the frequently written update block that show a relatively high frequency of writing the frequently written update block compared with other blocks of the nonvolatile memory and each recently written update block selected on the basis of a single recent nonsequential write to the recently written update block, wherein when the predetermined maximum limit is reached, the predetermined maximum limit is met by decreasing the number of frequently written update blocks of the third list in response to an increase in the number of recently written update blocks of the third list and by decreasing the number of recently written update blocks of the third list in response to an increase in the number of frequently written update blocks of the third list.

20. The method of claim 19 wherein an individual block is moved from the third plurality to the first plurality in a close operation in order to maintain the number of blocks in the third plurality of blocks below the predetermined maximum number.

21. A block erasable nonvolatile memory system, comprising:
an array of nonvolatile memory cells for storing a plurality of blocks; and
a controller arranged to perform the following operations:

maintaining a first list of update blocks containing non-sequentially stored data, each update block in the first list individually selected because of one recent non-sequential write operation to such update block, the first list of update blocks listing at least one update block that is in a closed condition in the block-erasable nonvolatile memory;

maintaining a second list of update blocks containing nonsequentially stored data, each update block in the second list individually selected because of two or more frequent nonsequential write operations to such update block, the second list of update blocks listing at least one update block that is in the closed condition in the block-erasable nonvolatile memory; and maintaining a plurality of open nonsequential update blocks that contain recently written valid data and are available for programming of additional data, the plurality of open nonsequential update blocks each individually listed in the first or second lists, the plurality of open nonsequential update blocks being limited to a predetermined maximum number by decreasing the number of open nonsequential update blocks of the first list in response to an increase in the number of open nonsequential update blocks of the second list and by decreasing the number of open nonsequential update blocks of the second list in response to an increase in the number of open nonsequential update blocks of the first list.

22. The memory system of claim 21 wherein the controller is further operable to change the number of open nonsequential update blocks of the first and second lists in response to a pattern of nonsequential memory writes.

23. The memory system of claim 21 wherein the controller is further operable to update the number of open nonsequential update blocks of the first and second lists when a block in the first or second list is nonsequentially written.

24. The memory system of claim 23 wherein the controller is further operable to update the number of open nonsequential update blocks of the first and second lists to have more blocks from the first list in response to a nonsequential write to an update block of the first list and to update the number of open nonsequential update blocks of the first and second lists to have more update blocks from the second list in response to a nonsequential write to an update block of the second list.

25. The memory system of claim 21 wherein the first list is ordered according to how recently update blocks of the first list were last written, more recently written update blocks of the first list maintained in the plurality of open nonsequential update blocks, and less recently written blocks of the first list maintained in a recently written history list.

26. The memory system of claim 25 wherein, in response to a write command directed to a first update block of the recently written history list, a second block from the plurality of open nonsequential update blocks is selected for a block close operation that removes the second block from the plurality of open nonsequential update blocks, thus precluding further programming of the second block without a block erase and wherein the first update block is moved to the top of the first list in response to the write command.

27. The memory system of claim 21 wherein the second list is ordered according to how frequently update blocks of the second list were last written, more frequently written update blocks of the second list maintained in the plurality of open nonsequential update blocks, and less frequently written update blocks of the second list maintained in a frequently written history list.

28. The memory system of claim 27 wherein the controller is further operable to, in response to a write command directed to a first update block of the frequently written history list, select a second update block from the plurality of open nonsequential update blocks for a block close operation that removes the second update block from the plurality of open nonsequential update blocks and precludes further programming of the second update block without a block erase.

29. The memory system of claim 27 wherein the controller is further operable to move the first update block to the top of the second list in response to the write command.

30. The memory system of claim 21 wherein the controller is further operable to, in response to one or more write commands directed to a third update block in the first list, move the third update block to the second list.

31. The memory system of claim 21 the controller is further operable to:
maintain a third list of update blocks containing sequentially stored data, each update block of the third list being identified as likely to remain sequential based on a first pattern of writing data;
maintain a fourth list of update blocks containing sequentially stored data, each update block of the fourth list being identified as unlikely to remain sequential based on a second pattern of writing data; and
maintain a plurality of open sequential blocks that are available for programming of additional data, the plurality of open sequential blocks each individually listed in the third list or the fourth list.

32. A block erasable nonvolatile memory system having a limited number of blocks in an open condition that accept additional programming and having other blocks in a closed condition, comprising:
an array of nonvolatile memory cells for storing a plurality of blocks; and
a controller arranged to perform the following operations:
maintaining a first list of update blocks containing sequentially stored data, each block in the first list identified as likely to remain sequential based on a first pattern of writing data;
maintaining a second list of update blocks containing sequentially stored data, each block in the second list identified as unlikely to remain sequential based on a second pattern of writing data, wherein the first pattern differs from the second pattern; and
maintaining a plurality of open sequential update blocks that contain recently written valid data and are available for programming of additional data, the plurality of open sequential blocks each being listed in the first list or the second list; and
maintaining each update block of the first list as sequential so that if there is a data gap between write commands that is less than a predetermined threshold, padding such data gap with copied data so that the update block remains sequential.

33. The memory system of claim 32 wherein a block from the plurality of open sequential update blocks is selected for a close operation, the selected block being the least recently written block of the first list, unless the first list is empty, in which case the selected block is the least recently written block of the second list.

34. The memory system of claim 32 wherein the first pattern of writing includes a write of a portion of data that starts at a predefined boundary location from a set of predefined boundary locations, and the second pattern of writing consists of a write of a portion of data that does not start at one of the predefined boundary locations.

35. The memory system of claim 34 wherein the predefined boundary locations are cluster boundary locations and the predefined number of sectors is the number of sectors in a cluster.

36. The memory system of claim 32 wherein the first pattern of writing includes a write of a portion of data having a length that is an integer number of groups of sectors, each group of sectors containing an equal predetermined number of sectors, and the second pattern of writing consists of a write of a portion of data having a length that is not an integer number of groups of sectors each containing the predetermined number of sectors.

37. A nonvolatile memory system that includes a number of individually erasable blocks comprising:
an array of nonvolatile memory cells for storing a plurality of blocks; and
a controller arranged to perform the following operations:
maintaining a first plurality of closed blocks, which individually contain data and are not available for programming of further data without erase;
maintaining a second plurality of open sequential update blocks that individually contain data stored in a physical order that reflects a logical order of the data, each open sequential update block being available for programming of further data; and
maintaining a third plurality of blocks as open chaotic update blocks that individually contain data that is stored in a physical arrangement that does not reflect a logical order, the third plurality of blocks including up to a predetermined maximum number of blocks, the third plurality of blocks selected to include a plurality of update blocks that each comprise a frequently written update block or a recently written update block, each frequently written update block selected on the basis of at least two nonsequential writes to the frequently written update block that show a relatively high frequency of writing the frequently written update block compared with other blocks of the nonvolatile memory and each recently written update block selected on the basis of a single recent nonsequential write to the recently written update block, wherein when the predetermined maximum limit is reached, the predetermined maximum limit is met by decreasing the number of frequently written update blocks of the third blocks in response to an increase in the number of recently written update blocks of the third blocks and by decreasing the number of recently written update blocks of the third blocks in response to an increase in the number of frequently written update blocks of the third blocks.

38. The memory system of claim 37 wherein the controller is further operable to move-an individual block from the third plurality to the first plurality in a close operation in order to maintain the number of blocks in the third plurality of blocks below the predetermined maximum number.

39. The memory system of claim 37 wherein each of the one or more third plurality of blocks is individually selected on the basis of a first number of recent nonsequential writes and the remainder of the third plurality of blocks are individually selected on the basis of a second number of nonsequential writes, the second number being greater than the first number.

* * * * *